United States Patent
Nakamura et al.

(10) Patent No.: US 11,146,436 B2
(45) Date of Patent: Oct. 12, 2021

(54) TERMINAL APPARATUS AND BASE STATION APPARATUS

(71) Applicants: SHARP KABUSHIKI KAISHA, Sakai (JP); FG INNOVATION COMPANY LIMITED, Tuen Mun (HK)

(72) Inventors: Osamu Nakamura, Sakai (JP); Takashi Yoshimoto, Sakai (JP); Jungo Goto, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 107 days.

(21) Appl. No.: 16/616,857

(22) PCT Filed: May 30, 2018

(86) PCT No.: PCT/JP2018/020646
§ 371 (c)(1),
(2) Date: Nov. 25, 2019

(87) PCT Pub. No.: WO2018/221549
PCT Pub. Date: Dec. 6, 2018

(65) Prior Publication Data
US 2021/0135920 A1    May 6, 2021

(30) Foreign Application Priority Data

May 31, 2017    (JP) .............................. JP2017-107943

(51) Int. Cl.
*H04L 27/26* (2006.01)
*H04L 5/00* (2006.01)

(52) U.S. Cl.
CPC ........ *H04L 27/2615* (2013.01); *H04L 5/0044* (2013.01); *H04L 27/2605* (2013.01)

(58) Field of Classification Search
CPC ............... H04L 27/2615; H04L 5/0044; H04L 27/2605; H04L 27/26; H04W 28/04; H04W 74/08
See application file for complete search history.

(56) References Cited

U.S. PATENT DOCUMENTS

| | | | | |
|---|---|---|---|---|
| 10,700,912 | B2 * | 6/2020 | Herath | ................ H04J 11/0036 |
| 2016/0330265 | A1 * | 11/2016 | Abdoli | ................ H04J 13/0003 |
| 2018/0077685 | A1 * | 3/2018 | Wu | ...................... H04W 72/02 |
| 2018/0145858 | A1 * | 5/2018 | Kim | .................. H04W 72/0453 |
| 2018/0242284 | A1 * | 8/2018 | Beale | ..................... H04L 5/0094 |

(Continued)

FOREIGN PATENT DOCUMENTS

| | | | | |
|---|---|---|---|---|
| EP | 3295635 B1 * | 9/2019 | ............ | H04L 5/0021 |
| WO | WO-2016159464 A1 * | 10/2016 | ......... | H04L 27/0006 |

(Continued)

OTHER PUBLICATIONS

"Study on provision of low-cost Machine-Type Communications (MTC) User Equipments (UEs) based on LTE", 3GPP TR36.888 V12.0.0, Jun. 2013.

(Continued)

*Primary Examiner* — Jay P Patel
(74) *Attorney, Agent, or Firm* — ScienBiziP, P.C.

(57) ABSTRACT

Proper use of a sparse code prevents PAPR performance from improperly degrading.

5 Claims, 10 Drawing Sheets

(56) References Cited

U.S. PATENT DOCUMENTS

| | | | |
|---|---|---|---|
| 2018/0310257 A1* | 10/2018 | Papasakellariou | H04W 52/50 |
| 2018/0337816 A1* | 11/2018 | Herath | H04L 1/0075 |
| 2021/0135919 A1* | 5/2021 | Lee | H04W 52/146 |

FOREIGN PATENT DOCUMENTS

| | | | | |
|---|---|---|---|---|
| WO | WO-2018027589 A1 * | 2/2018 | | H04W 28/04 |
| WO | WO-2018028123 A1 * | 2/2018 | | H04W 28/04 |

OTHER PUBLICATIONS

"Cellular system support for ultra-low complexity and low throughput Internet of Things (CIoT)", 3GPP TR45.820 V13.0.0, Aug. 2015.

Huawei et al., "Sparse Code Multiple Access (SCMA) for 5G radio transmission", R1-162155, 3GPP TSG RAN WG1 Meeting #84bis Busan, Korea, Apr. 11-15, 2016.

* cited by examiner

TERMINAL APPARATUS AND BASE STATION APPARATUS

TECHNICAL FIELD

The present invention relates to a transmission apparatus and a reception apparatus.

This application claims priority based on JP 2017-107943 filed on May 31, 2017, the contents of which are incorporated herein by reference.

BACKGROUND ART

In recent years, 5th Generation mobile communication systems have been standardized, where a goal is to achieve MTC by a large number of terminal apparatuses (massive machine type communications: mMTC), ultra-reliable and low latency communications (URLLC), and large-capacity, high-speed communications (enhanced mobile broadband: eMBB). Especially, Internet of Things (IoT) is expected to be achieved by using various types of apparatuses in the future, and achieving the mMTC has been one of important factors in 5G.

For example, in 3rd Generation Partnership Project (3GPP), a Machine-to-Machine (M2M) communication technology has been standardized as a Machine Type Communication (MTC) that accommodates a terminal apparatus that transmits and/or receives small size data (NPL 1). Furthermore, in order to support data transmission at a low rate in a narrow band, standardization of Narrow Band-IoT (NB-IoT) has been conducted (NPL 2).

In Long Term Evolution (LTE), LTE-Advanced, LTE-Advanced Pro, and the like that have been standardized in the 3GPP, a terminal apparatus transmits a Scheduling Request (SR) in a case that a traffic of transmission data occurs, and after the terminal apparatus receives control information of an uplink transmission grant (UL Grant) from a base station apparatus, the terminal apparatus transmits data with transmission parameters of the control information included in the UL Grant at a predetermined timing. In this manner, a radio communication technology is achieved that allows the base station apparatus to perform radio resource control for all uplink data transmissions (data transmissions from the terminal apparatus to the base station apparatus). Accordingly, the base station apparatus can achieve an Orthogonal Multiple Access (OMA) by controlling the radio resources and can receive uplink data by simple reception processing.

Meanwhile, in such a conventional radio communication technology, in order for the base station apparatus to perform all radio resource controls, the control information need to be transmitted and/or received before the data transmission regardless of amount of data to be transmitted by the terminal apparatus. Especially, in a case that the size of the data to be transmitted is small, the control information accounts for a relatively high proportion. Thus, in a case that a terminal performs a transmission of data with a small size, a contention-based (grant-free) radio communication technology in which the terminal apparatus performs a SR transmission and a data transmission without receiving the UL Grant transmitted by the base station apparatus, is effective in terms of an overhead taken by the control information. Furthermore, in the contention-based radio communication technology, a time taken from data generation to data transmission may be shortened.

In the contention-based radio communications, since the UL Grant is absent, a large number of terminal apparatuses may use the same radio resources. In other words, a large number of signals collide with one another and are received by a receive antenna of the base station apparatus. A reception apparatus in the base station apparatus needs to detect signals from the respective terminal apparatuses, and Sparse Code Multiple Access (SCMA) has been proposed as one of methods to address such a need. In the SCMA, data is spread to multiple subcarriers by using a code book including zeros (sparse code) and transmitted, with the assumption of an access method, such as an OFDM, that has multiple subcarriers. The use of a message passing algorithm (MPA) allows a receiver to detect a signal with a small amount of computation (NPL 3).

CITATION LIST

Non Patent Literature

NPL 1: 3GPP, TR36.888 V12.0.0, "Study on provision of low-cost Machine-Type Communications (MTC) User Equipments (UEs) based on LTE," June 2013

NPL 2: 3GPP, TR45.820 V13.0.0, "Cellular system support for ultra-low complexity and low throughput Internet of Things (CIoT)," August 2015

NPL 3: Huawei, HiSilicon, "Sparse Code Multiple Access (SCMA) for 5G radio transmission", R1-162155, Busan, Korea, Apr. 11-15, 2016

SUMMARY OF INVENTION

Technical Problem

The SCMA performs spreading by using sparse code, and a Peak-to-Average Power Ratio (PAPR) significantly varies depending on which sparse code is used. As for the sparse code, while the use of the sparse code in a frequency direction has been proposed, the use of the sparse code in a time direction can also be considered taking into account a frequency fluctuation due to fading. At this time, there is a case where powers of multiple OFDM symbols become zeros. In a case that the power of a certain OFDM symbol becomes zero, an average transmit power of an entire frame (or subframe or slot) decreases, and therefore the PAPR increases. The degradation of the PAPR is not preferable because it leads to a load on a power amplifier, considering a terminal apparatus, in particular, a sensor assumed in the mMTC or the like.

One aspect of the present invention has been made in view of the foregoing, and there is provided a technology for preventing the degradation of the PAPR in an access method using the sparse code such the SCMA.

Solution to Problem (1) One aspect of the present invention has been made to solve the above-described problems, and one aspect of the present invention is a terminal apparatus that transmits a data signal to a base station apparatus. The terminal apparatus includes a transmission parameter configuration unit, a spread unit, and a mapping unit. The transmission parameter configuration unit is configured to generate a sequence including a zero. The spread unit is configured to multiply a modulation symbol of the data signal by the sequence. The mapping unit is configured to map the signal multiplied by the sequence to a first radio resource area or a second radio resource area including multiple resource elements. The transmission parameter configuration unit cause the sequence by which the modulation symbol mapped to the first radio resource area is multiplied and the sequence by which the modulation symbol mapped to the second radio resource area is multiplied to be differently configured.

(2) In addition, according to one aspect of the present invention, the first radio resource area is included in a first OFDM symbol. The second radio resource area is included in a second OFDM symbol. A subcarrier for a resource element of the multiple resource elements in the first radio resource area overlaps with a subcarrier for a resource element of the multiple resource elements in the second radio resource area.

(3) In addition, according to one aspect of the present invention, the transmission parameter configuration unit configures the sequence such that the number of the multiple resource elements included in the first OFDM symbol becomes identical to the number of the multiple resource elements included in the second OFDM symbol.

(4) In addition, according to one aspect of the present invention, the first radio resource area is included in a first subcarrier, the second radio resource area is included in a second subcarrier. An OFDM symbol for a resource element of the multiple resource elements in the first radio resource area overlaps with an OFDM symbol for a resource element of the multiple resource elements in the second radio resource area.

(5) In addition, according to one aspect of the present invention, the multiple resource elements in the first radio resource area and the multiple resource elements in the second radio resource area include a first OFDM symbol and a second OFDM symbol. The transmission parameter configuration unit configures the sequences such that the number of the multiple resource elements included in the first OFDM symbol becomes identical to the number of the multiple resource elements included in the second OFDM symbol.

(6) In addition, according to one aspect of the present invention, the transmission parameter configuration unit causes the sequence by which the modulation symbol mapped to the first radio resource area is multiplied and the sequence by which the modulation symbol mapped to the second radio resource area is multiplied to be differently configured depending on whether transmission is an initial transmission or a retransmission.

Advantageous Effects of Invention

According to the aspects of the present invention, a reduction in a PAPR can be achieved in an access method, such as SCMA, that uses a sparse code.

DESCRIPTION OF EMBODIMENTS

Figure 1:
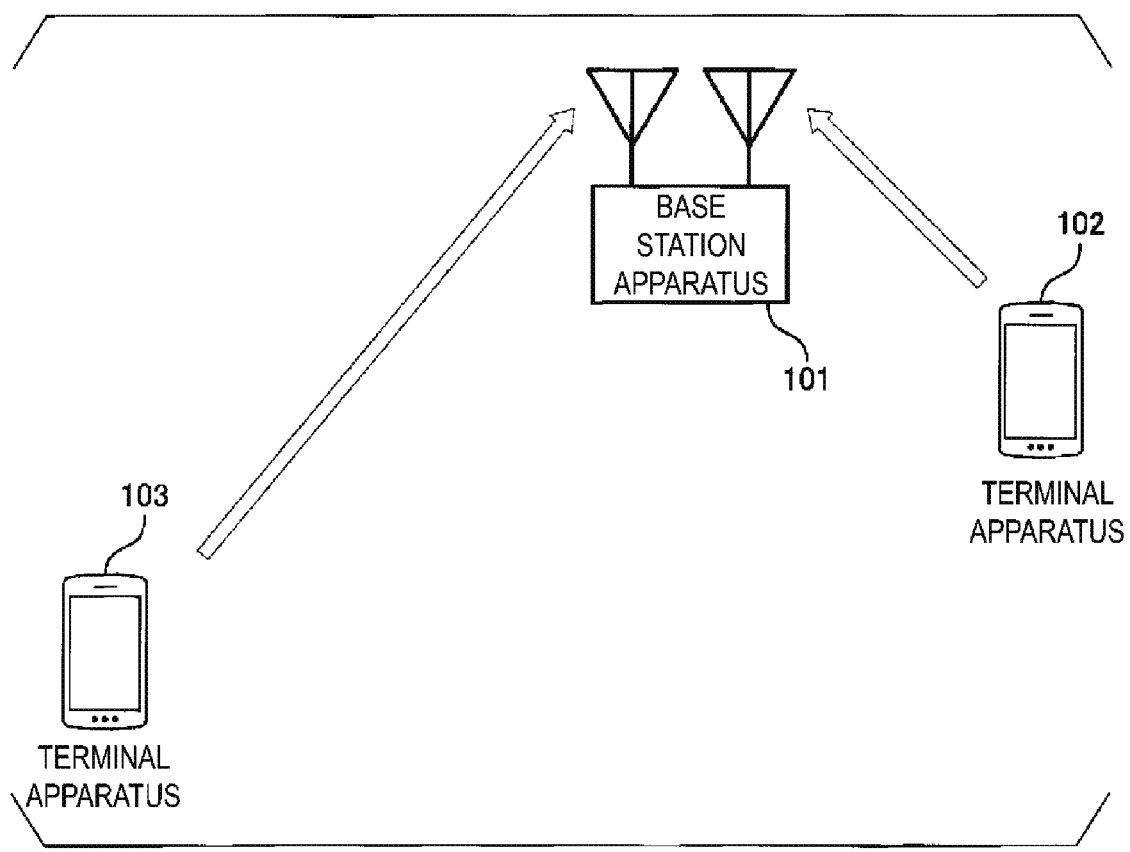
FIG. 1 is a diagram illustrating an example of a system configuration according to the present embodiment.

Techniques described herein can be used in various kinds of radio communication systems, such as a Code Division Multiplexing Access (CDMA) system, a Time Division Multiplexing Access (TDMA) system, a Frequency Division Multiplexing Access (FDMA) system, an Orthogonal FDMA (OFDMA) system, a Single Carrier FDMA (SC-FDMA) system, and another system. Terms "system" and "network" may often be used synonymously. A radio technology (standard), such as Universal Terrestrial Radio Access (UTRA), and cdma2000 (registered trademark), can be implemented in the CDMA system. The UTRA includes a broadband CDMA (WCDMA (registered trademark)) and other modifications of the CDMA. The cdma2000 covers IS-2000, IS-95, and IS-856 standards. A radio technology, such as a Global System for Mobile Communications (GSM (registered trademark)) can be implemented in the TDMA system. A radio technology, such as Evolved UTRA (E-UTRA), Ultra Mobile Broadband (UMB), IEEE802.11 (Wi-Fi), IEEE802.16 (WiMAX), IEEE802.20, and a Flash-OFDM (registered trademark), can be implemented in the OFDMA system. 3GPP Long Term Evolution (LTE) is an E-UTRA that uses the OFDMA on downlink and the SC-FDMA on uplink. LTE-A is a system, a radio technology, and a standard that have improved LTE. The UTRA, E-UTRA, LTE, LTE-A, and GSM (registered trademark) are described in documents from an institution named as the Third Generation Partnership Project (3GPP). The cdma2000 and UMB are described in documents from an institution named as the 3rd Generation Partnership Project 2 (3GPP2). For clarification, some aspects of the technology are described below as to data communications in the LTE and the LTE-A, and terms of the LTE and terms of the LTE-A are often used in the following description.

Preferable embodiments according to one aspect of the present invention will be described below in detail with reference to the accompanying drawings. The detailed description, which is disclosed in the following together with the accompanying drawings, is to describe exemplary embodiments of the present invention and is not intended to describe only one embodiment that allows the present invention to be embodied. The following detailed description includes specific details to provide complete understanding of the present invention. However, it is seen by one skilled in the art that one aspect of the present invention can be embodied even without such specific details. For example, while the following detailed description will be specifically described assuming that mobile communication systems are 3GPP LTE and LTE-A systems, the description is also applicable to any other mobile communication system except for matters specific to the 3GPP LTE and the LTE-A. Additionally, terms described below are terms defined in consideration of functions according to one aspect of the present invention and possibly vary depending on the intent, convention, or the like of a user and an operator. Accordingly, the terms should be defined based on content throughout the entire specification.

In describing the embodiments, a description of technical content that is well known in a technical field to which one aspect of the present invention belongs and not directly related to one aspect of the present invention will be omitted. This is because, by omitting the unnecessary descriptions, the gist of the present invention is not obscured and is more clearly conveyed. Accordingly, in some cases, to avoid concepts of the present invention from being vague, the known configuration and apparatus can be omitted, or the description can be illustrated in the form of a block diagram to focus on key functions of each structure and apparatus. Some components in the drawings are exaggerated, omitted, or illustrated schematically such that the gist of the present invention is not obscured and is more clearly conveyed. A size of each component does not correspond to its actual size. In addition, the description is given using the same reference numerals for the same components in the drawings throughout the specification.

Throughout the specification, a description that one part "includes" one component means that the one part can further include other components, rather than excluding other components unless specifically stated to the contrary. Furthermore, the term "or" in any of the detailed description or the claims is used not to mean exclusive "or," but is intended to mean inclusive "or." That is, unless otherwise specified or unless clear from the context, a phrase "X uses A or B" is intended to mean any of natural inclusive permutations. That is, the phrase "X uses A or B" is met by both of the following examples: X uses A; X uses B; or X uses both A and B. In addition, articles "a" and "an" used in this application and the appended claims should generally be interpreted to mean "one or more" unless otherwise specified or unless clear from the context intending a singular form. Furthermore, terms such as " . . . unit," " . . . instrument," and "module," described in the specification mean a unit configured to process at least one function or operation and can be embodied by hardware or software or a combination of hardware and software.

Additionally, in the following description, a terminal apparatus is a generic term of a movable or fixed user terminal instrument, such as User Equipment (UE), mobile stations (Mobile Station (MS) and a Mobile Terminal (MT)), a mobile station apparatus, a mobile terminal, a subscriber unit, a subscriber station, a wireless terminal, a mobile device, a node, a device, a remote station, a remote terminal, a wireless communication device, a wireless communication apparatus, a user agent, and an access terminal. The terminal apparatus can be a cellular phone, a cordless phone, a session initiation protocol (SIP) phone, a smartphone, a wireless local loop (WLL) station, a personal digital assistant (PDA), a tablet, a laptop, a hand-held communication device, a hand-held computing device, a satellite radio, a wireless modem card, a router, and/or another processing device for communications through a wireless system. The base station apparatus is a generic term of any given network-end node communicating with a terminal, such as a node B (NodeB), an enhanced node B (eNodeB), a base station, and an access point (AP). Note that the base station apparatus includes a Remote Radio Head (RRH, a device including an outdoor radio unit smaller than the base station apparatus, also referred to as a Remote Radio Unit (RRU)) (also referred to as a remote antenna and a distributed antenna). It can be said that the RRH is a special configuration of the base station apparatus. It can be said that, for example, the RRH is a base station apparatus in which only a signal processing unit is included, and configuration of parameters used in the RRH, determination of scheduling, and the like are performed by another base station apparatus.

The terminal apparatus of the present invention may be configured to include a memory and a processor. The memory stores instructions related to various processes described below. The processor is coupled to the memory and configured to perform the instructions stored in the memory. The base station apparatus of the present invention may be configured to include a memory and a processor. The memory stores instructions related to various processes described below. The processor is coupled to the memory and configured to perform the instructions stored in the memory.

First Embodiment

FIG. 1 is one example of a radio communication system according to the present embodiment. The system includes a base station apparatus 101, a terminal apparatus 102, and a terminal apparatus 103. One or more antenna ports may be configured for each apparatus. Here, the antenna port refers to a logical antenna that can be recognized by an apparatus that performs communications, rather than a physical antenna.

Figure 2:
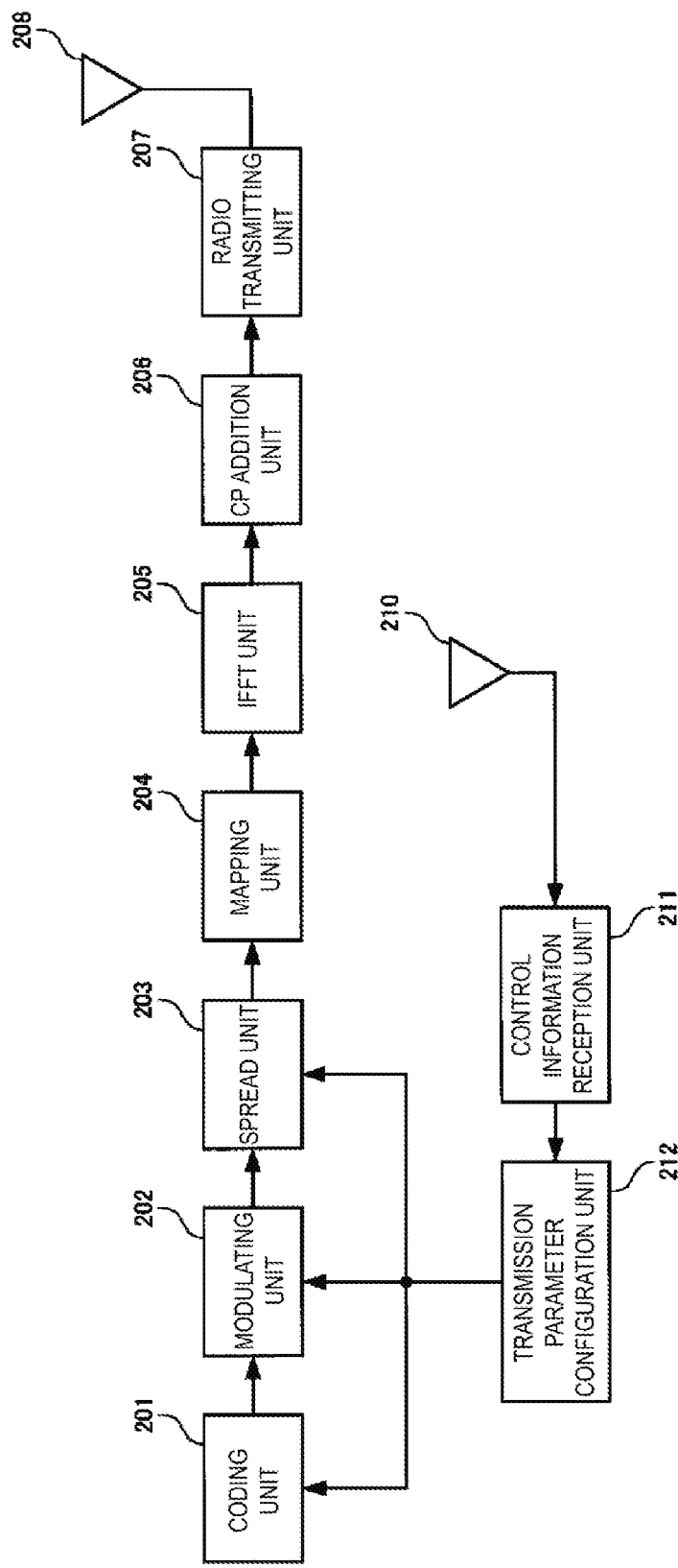
FIG. 2 is a diagram illustrating a configuration example of a transmitter in a terminal apparatus according to the present embodiment.

FIG. 2 is one example of a configuration of the terminal apparatus according to the present embodiment. While the following gives the description with an example in a case that information data (data signal) is transmitted to the base station, a case that control information, not the information data, is transmitted to the base station is also included in one aspect of the present invention. That is, one aspect of the present invention may be applied to, not a Physical Uplink Shared Channel (PUSCH), but a Physical Uplink Control Channel (PUCCH). In the present embodiment, the control information transmitted from the base station apparatus 101 is received by a control information reception unit 211 via a receive antenna 210 in the terminal apparatus 102. The received control information (configuration information of a higher layer (Radio Resource Control (RRC)) or downlink control information (DCI)) is input to a transmission parameter configuration unit 212. In the parameter configuration, a coding rate, a modulation scheme, a sparse code pattern for spreading, and radio resource allocation information are configured. Information on the coding rate is input to a coding unit 201, information on the modulation scheme is input to a modulating unit 202, information on the sparse code pattern is input to a spread unit 203, and information on the radio resource allocation information is input to the coding unit 201 and the mapping unit 204. Note that, the pieces of the information described above need not be uniquely determined only with signals input from the control information reception unit 211, and the inputs from the control information reception unit 211 may allow some candidates to be selected, and the terminal apparatus may autonomously determine the transmission parameter. In addition, for example, not only patterns in which allocations of zeros in the sparse codes are different, but also multiple candidates of sparse codes in which the number of zeroes (non-zeroes) are different may be present, and according to a status of the terminal (for example, a remaining amount of battery and a QoS), and the like, the terminal apparatus may autonomously determine the sparse code. In addition, regarding radio resources as well, some candidates that have different bandwidths and include different numbers of OFDM symbols (including the number of slots or subframes or frames) may be present.

The transmission data is input to the coding unit 201, and an error correcting code is applied. A turbo code, an LDPC code, a convolutional code, a polar code, and the like are usable as the error correcting code. A coded bit sequence output from the coding unit 201 is input to the modulating unit 202. Modulation processing such as BPSK, QPSK, 16QAM, 64QAM, 256QAM, and 1024QAM are performed by the modulating unit 202. Note that, as described in NPL 3, the processing in the spread unit 203 and the processing in the modulating unit 202 may be performed collectively. A modulation symbol sequence output by the modulating unit 202 is input to the spread unit 203. The spread unit 203 spreads modulation symbols in the input modulation symbol sequence.

Figure 3:
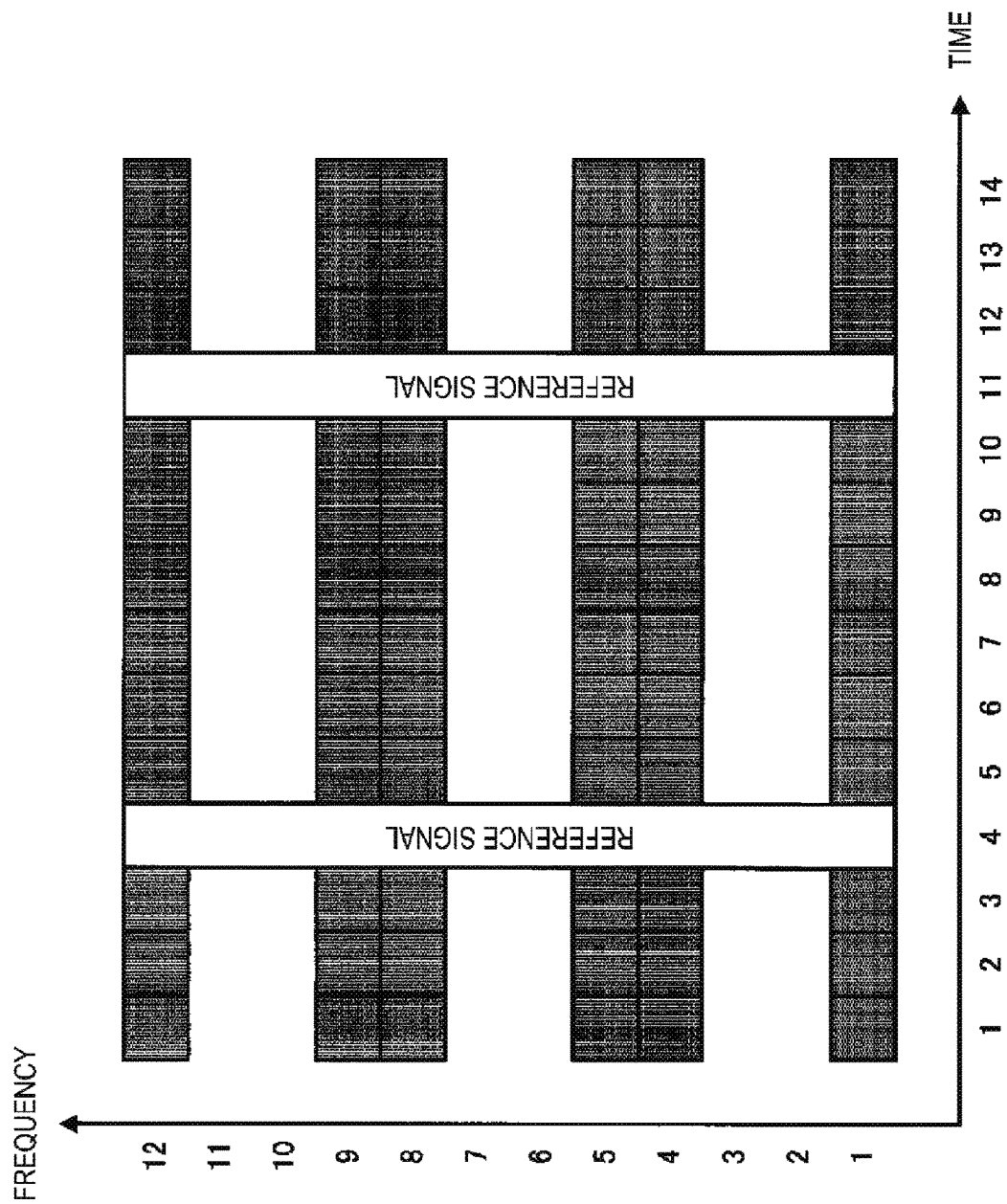
FIG. 3 is a diagram illustrating a resource allocation in a case that a fixed sparse code is applied to a frequency domain according to the present embodiment.
Figure 4:
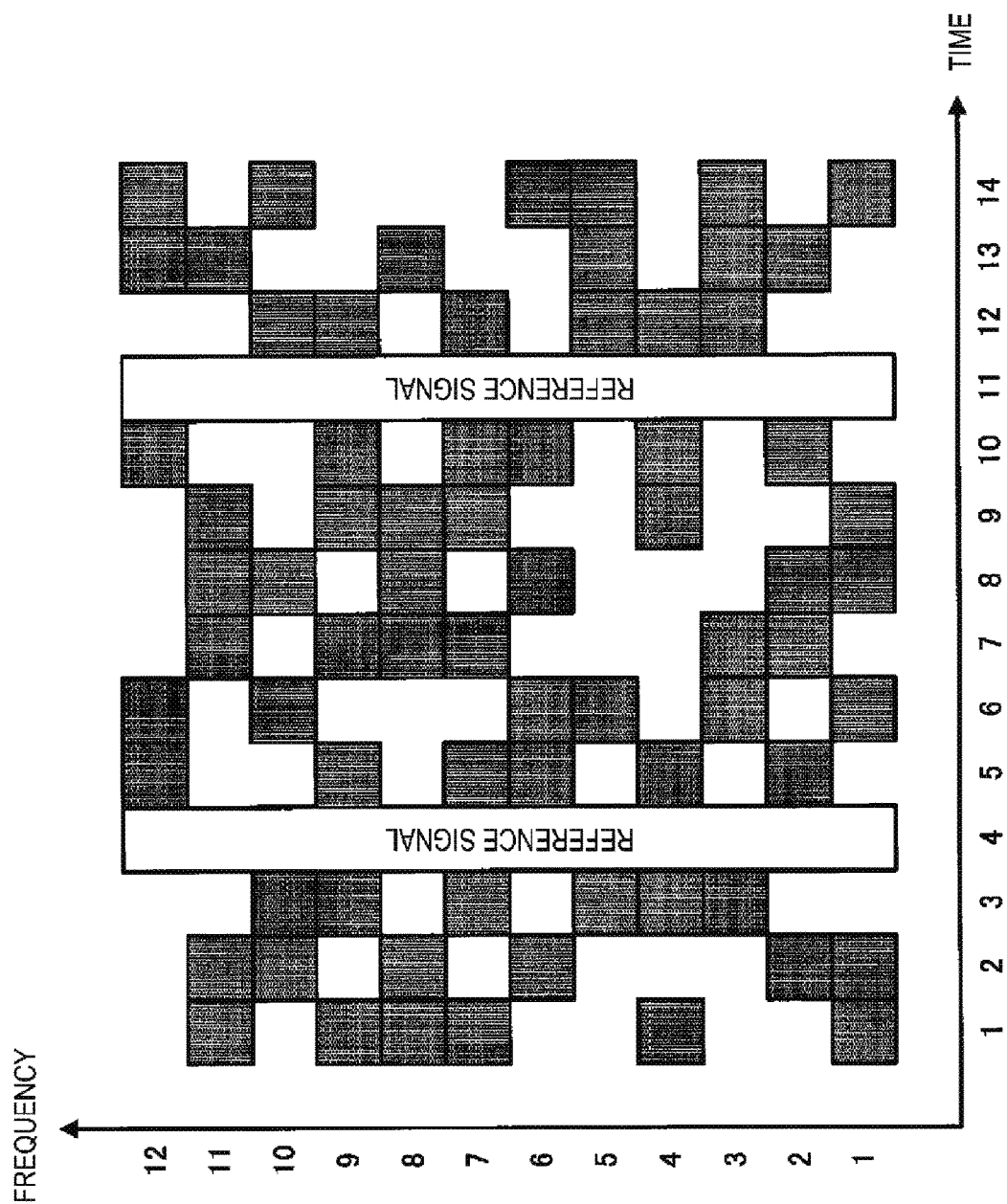
FIG. 4 is a diagram illustrating a resource allocation in a case that a variable sparse code is applied to the frequency domain according to the present embodiment.

FIG. 3 is an example of spreading the modulation symbols according to the present embodiment. FIG. 3 illustrates an example of spreading in a frequency domain. Each of the modulation symbols is mapped to a resource element including one frequency domain (subcarrier) and one time domain (OFDM symbol) as a unit of a radio resource area. In the present embodiment, the radio resource area to which the modulation symbol after the spreading is mapped includes one or more frequency domains (subcarriers) and one or more time domains (OFDM symbols). Note that although a subframe configuration of the LTE is utilized and reference signals are inserted into the 4th and 11th OFDM symbols, the positions and the number of reference signals are not limited thereto, the reference signal may be mapped to the head of the subframe (slot, mini-slot), or the number of reference signals may be variable. For example, in FIG. 3, the 1st modulation symbol is mapped to radio resources including the 1st subcarrier to the 4th subcarrier in the 1st OFDM symbol based on the sparse code. The 2nd modulation symbol is mapped to radio resources including the 5th subcarrier to the 8th subcarrier in the 1st OFDM symbol based on the sparse code. The 3rd modulation symbol is mapped to radio resources including the 9th subcarrier to the 12th subcarrier in the 1st OFDM symbol based on the sparse code. FIG. 3 is an example in which the same sparse code is used in the radio resource area including 12 subcarriers and 14 OFDM symbols. FIG. 3 illustrates an example in which the 1st modulation symbol is spread to the 1st and 4th subcarriers (resource elements) in the 1st OFDM symbol using a sparse code [1,0,0,1], the 2nd modulation symbol is spread to the 5th and 8th subcarriers in the 1st OFDM symbol using the sparse code [1,0,0,1], and the 3rd modulation symbol is spread to the 9th and 12th subcarriers in the 1st OFDM symbol using the sparse code [1,0,0,1]. However, the non-zero element is not limited to one but may be a complex number with amplitude of 1. The amplitude may not be 1, but may be a value of a certain power for all the sparse codes. FIG. 3 is a case in which the same spread pattern is applied to all OFDM symbols. FIG. 4 is another example of spreading the modulation symbols according to the present embodiment. As illustrated in FIG. 4, a different sparse code can be used for each OFDM symbol. For example, in FIG. 4, the 1st modulation symbol is mapped to the radio resources including the 1st subcarrier to the 4th subcarrier in the 1st OFDM symbol based on the sparse code. The 2nd modulation symbol is mapped to the radio resources including the 5th subcarrier to the 8th subcarrier in the 1st OFDM symbol based on the sparse code. The 3rd modulation symbols is mapped to the radio resources including the 9th subcarrier to the 12th subcarrier in the 1st OFDM symbol based on the sparse code. FIG. 4 illustrates an example in which the 1st modulation symbol is spread to the 1st and 4th subcarriers in the 1st OFDM symbol using a sparse code [1,0,0,1], the 2nd modulation symbol is spread to the 5th and 8th subcarriers in the 1st OFDM symbol using a sparse code [0,0,1,1], and the 3rd modulation symbol is spread to the 9th and 12th subcarriers in the 1st OFDM symbol using a sparse code [1,0,1,0]. At this time, the sparse code to be used is determined by information on a sequence index of the sparse code, a time index such as a subframe number, and a frequency index such as a subcarrier number, which are input from the transmission parameter configuration unit 212.

As described above, in a case that a sequence length of the sparse code is four and the number of null carriers in the sparse code (the number of zero elements in the sparse code) is two, there are $_4C_2$=six patterns of sequences of the sparse code. This is one example, and in a case that the sequence length is configured to be longer, the number of sequences increases. Here, the PAPR of the OFDM symbol is dependent on the sequence. Accordingly, the transmission parameter configuration unit 212 holds only sequences of which the PAPR is smaller than a predetermined value, and selects a code from limited sequences, thus making it possible to prevent the PAPR from increasing.

As a method to prevent the PAPR from increasing, there is a method of using only the sparse codes that cause the subcarriers to be allocated at equal intervals. An output from the modulating unit 202 is not input to the spread unit 203, but is input to a DFT unit (not illustrated) to apply a DFT. A signal after the DFT is input to the spread unit 203. The spread unit 203 non-contiguously allocates spectra at equal intervals, thus allowing sparse (sparse) signals to be generated in the frequency domain or in the time domain while preventing peak power from increasing. The intervals of the spectra of the respective terminal apparatuses need not be constant, and the base station apparatus notifies a position of the first subcarrier and the interval of the spectra with the DCI or by the RRC.

In a case that the sparse code is applied to the frequency domain, performing scrambling processing is considered as another method for preventing the PAPR from increasing. A scrambling unit is inserted between the mapping unit 204 and an IFFT unit 205, and the scrambling processing is applied to an output from the mapping unit 204. The scrambling processing is performed with a code, such as a PN code and an M sequence. The sequence is not limited thereto, and the input sequence may be multiplied by any sequence, such as a ZC sequence. Note that the sequence to be used may be configured with a cell-specific ID, a terminal-specific ID, or the like, and a subframe number or the like.

Any reference signal may be used. Since the reference signals of the multiple terminal apparatuses need to be separated, a cyclic shift, an OCC, an Interleaved Frequency Division Multiple Access (IFDMA), or the like needs to be used. Accordingly, for example, associating an amount of turning of the cyclic shift and the like with the sequence of sparse code allows the sequences of both of the reference signal and the sparse code to be generated by notifying one value from the base station apparatus to the terminal apparatus. The number of cyclic shift values is designed to be the same as or greater than the number of sequences of the sparse code. Thus, in a case that the value of the cyclic shift is configured, the sequence of sparse code is uniquely determined. Alternatively, a control signal that specifies one sparse code among the multiple sparse codes associated with the same cyclic shift may be received to determine the sparse code. The reference signal is generated by a reference signal generation unit (not illustrated) and is input to the mapping unit 204.

Figure 5:
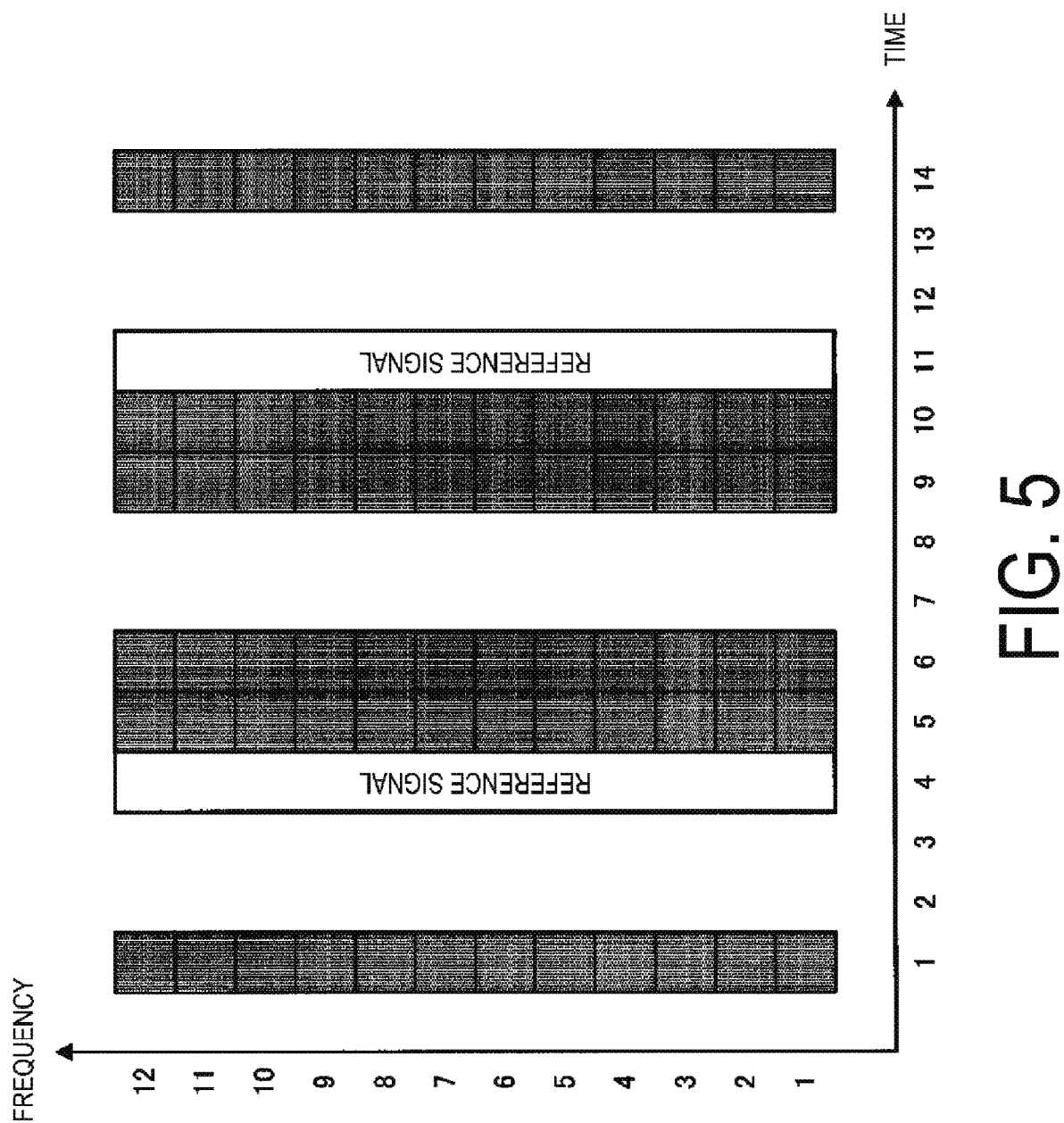
FIG. 5 is a diagram illustrating a resource allocation in a case that the fixed sparse code is applied to a time domain according to the present embodiment.

FIG. 5 is another example of spreading the modulation symbols according to the present embodiment. FIG. 5 illustrates an example of spreading the SCMA in the time domain. FIG. 5 is an example in which the same sparse code is used in the radio resource area including the 12 subcarriers and the 14 OFDM symbols. In FIG. 5, the 1st modulation symbol is mapped to radio resources (excluding areas to which the reference signals are mapped) including the 1st time domain (OFDM symbol) to the 5th time domain in the 1st frequency domain (subcarrier) based on the sparse code. The 2nd modulation symbol is mapped to radio resources including the 1st time domain to the 5th time domain in the 2nd frequency domain based on the sparse code. The 3rd modulation symbol is mapped to radio resources including the 1st subcarrier to the 5th subcarrier in the 3rd frequency domain based on the sparse code. Similarly, other modulation symbols are mapped to the time domains based on the sparse codes. FIG. 5 illustrates an example in which the 1st modulation symbol are spread to the 1st and 5th OFDM symbols (resource elements) in the 1st subcarrier using a sparse code [1,0,0,1], the 2nd modulation symbol is spread to the 1st and 5th OFDM symbols in the 2nd subcarrier using a sparse code [1,0,0,1], and the 3rd modulation symbol is spread to the 1st and the 5th OFDM symbols in the 3rd subcarrier using a sparse code [1,0,0,1]. For this reason, while the 1st, 5th, 6th, 9th, 10th, and 14th OFDM symbols have data in all subcarriers, the 2nd, 3rd, 7th, 8th, 12th, and 13th OFDM symbols do not have data, and therefore the OFDM symbols are not transmitted. As a result, in considering an entire subframe, the average transmit power decreases compared to a case that all the OFDM symbols have data. However, the peak does not fall as much, and therefore the PAPR increases compared to a case of the spreading in the frequency domain.

Figure 6:
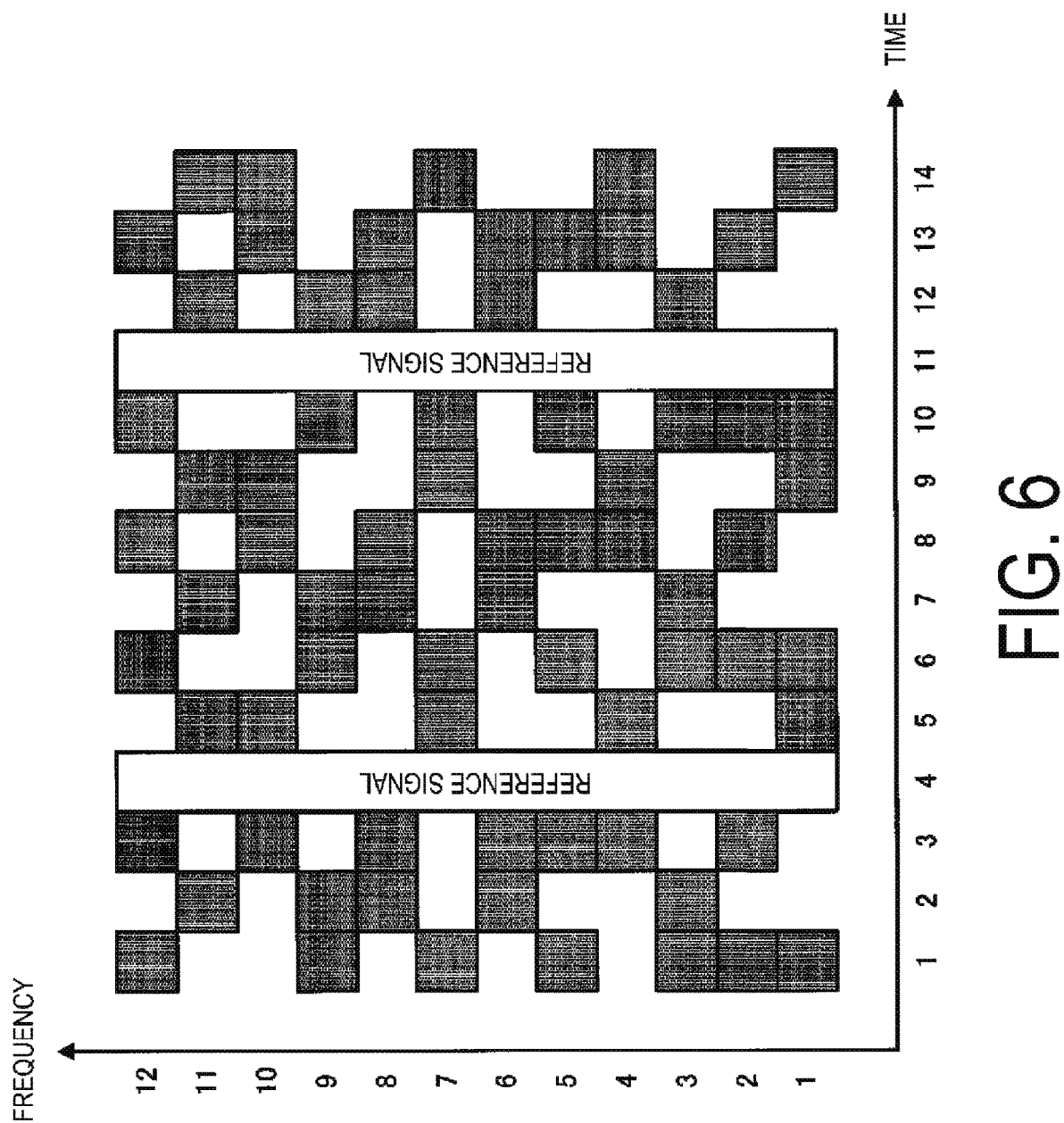
FIG. 6 is a diagram illustrating a resource allocation in a case that a different sparse code for each subcarrier is applied to the time domain according to the present embodiment.

Therefore, use of a different sparse code for each subcarrier is considered, rather than use of the same sparse code for the respective subcarriers for spreading. FIG. 6 is another example of spreading the modulation symbols according to the present embodiment. FIG. 6 illustrates an example of spreading in the time domain using a different sparse code for each subcarrier. For example, in FIG. 6, the 1st modulation symbol mapped to the 1st to 5th OFDM symbols in the 1st subcarrier is spread with [1,0,0,1]. Thus, the data is duplicated (allocated) to the 1st and 4th OFDM symbols (resource elements) in the 1st subcarrier. Similarly, the 2nd modulation symbol mapped to the 1st and 3rd OFDM symbols in the 2nd subcarrier is spread with [1,0,1,0]. Thus, the data is duplicated to the 1st and 3rd OFDM symbols in the 2nd subcarrier. Other modulation symbols are similarly spread. As a result, since a subcarrier where data transmission is performed is present in all OFDM symbols, an OFDM symbol of which the transmit power is zero is less likely to be generated. Thus, significant degradation of the PAPR can be avoided. Here, while the base station apparatus may notify the terminal apparatus of which sparse code to be used to spread each modulation symbol, the base station apparatus may notify the terminal apparatus of only an index of a reference sparse code such that the sparse codes applied to modulation symbols are determined by the index of the sparse code, a subcarrier index, and an OFDM symbol index. Here, the sparse code index notified from the base station apparatus to the terminal apparatus may be notified using the DCI or the RRC.

By spreading the data with the different sparse codes for the subcarriers, the OFDM symbol where the number of subcarriers is zero, that is, the transmit power is zero is less likely to occur, making it possible to improve the PAPR.

The description that the PAPR can be improved by using a different sparse code for each subcarrier in a case that the sparse codes are applied in the time direction has been given by using FIG. 6. However, for example, while the 1st OFDM symbol includes seven subcarriers in FIG. 6, the 2nd OFDM symbol includes five subcarriers. In other words, in a case that a spectral power spectral density is constant in the subcarriers, the power of the 2nd OFDM symbol is comparatively low, and the power of the 1st OFDM symbol is comparatively high. This means that the transmit power is different for each OFDM symbol. This also causes the degradation of the PAPR. Next, a method for selecting sparse codes to solve the problem will be described.

Figure 7:
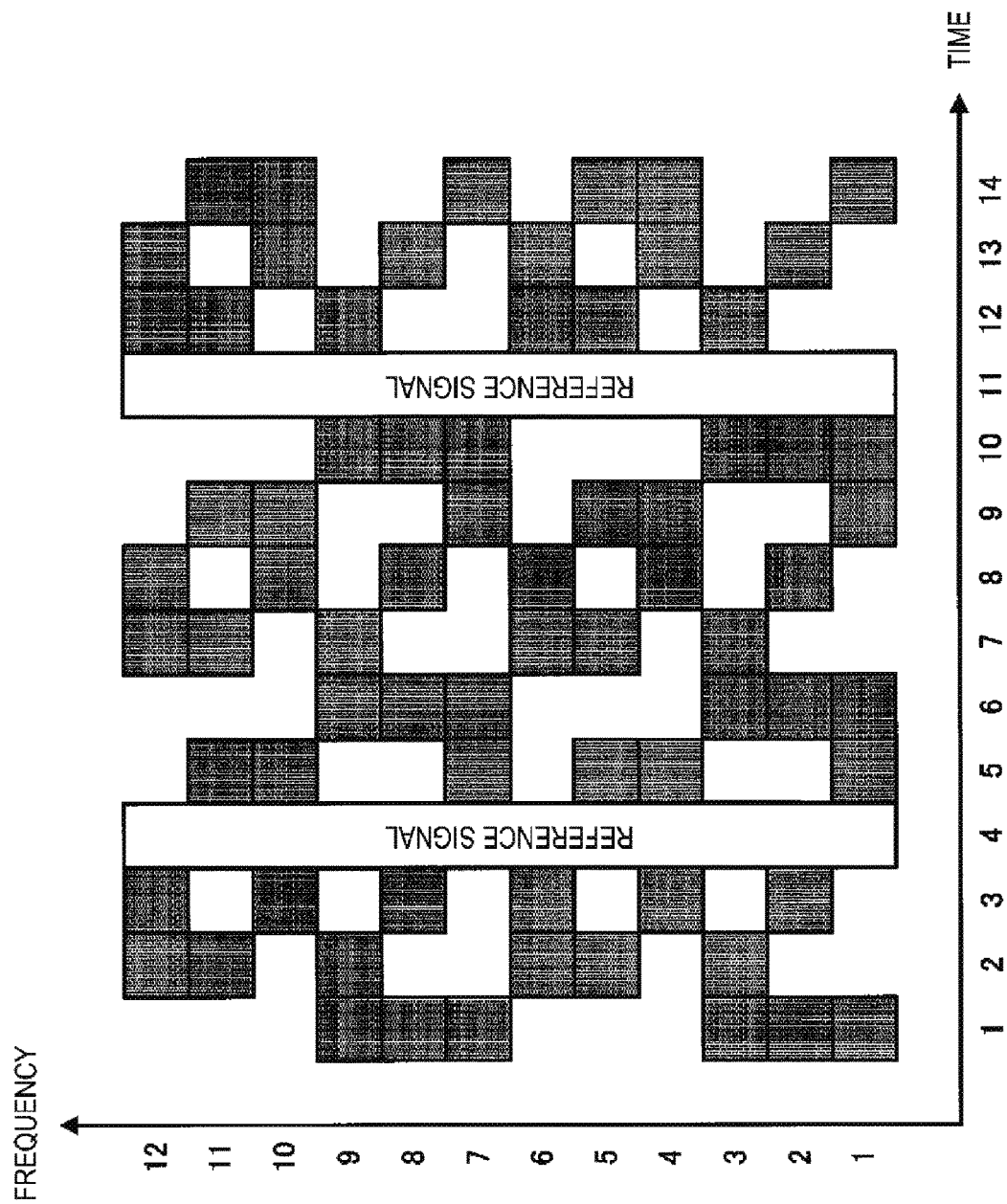
FIG. 7 is a diagram illustrating a resource allocation in a case that the sparse code is applied such that the number of subcarriers for each OFDM symbol becomes constant according to the present embodiment.

FIG. 7 is another example of spreading the modulation symbols according to the present embodiment. FIG. 7 illustrates an application example of the sparse codes in a case that the transmit power of each OFDM symbol is constant. FIG. 7 illustrates an example of spreading in the time domain using a different sparse code for each subcarrier. In FIG. 7, the sparse codes are applied such that the number of subcarriers becomes six in each OFDM symbol. As a result, since the transmit power does not change for each OFDM symbol, the deterioration of the PAPR is less likely to occur. There are various methods to cause the numbers of subcarriers in the respective OFDM symbols to be constant. As an example, the sparse codes used in the respective subcarriers are configured to be the same and all of the sparse codes are used by the same number of times in frequency resources allocated. As a result, the numbers of null subcarriers in the respective OFDM symbols become constant, and therefore the deterioration of the PAPR can be reduced.

Figure 10:
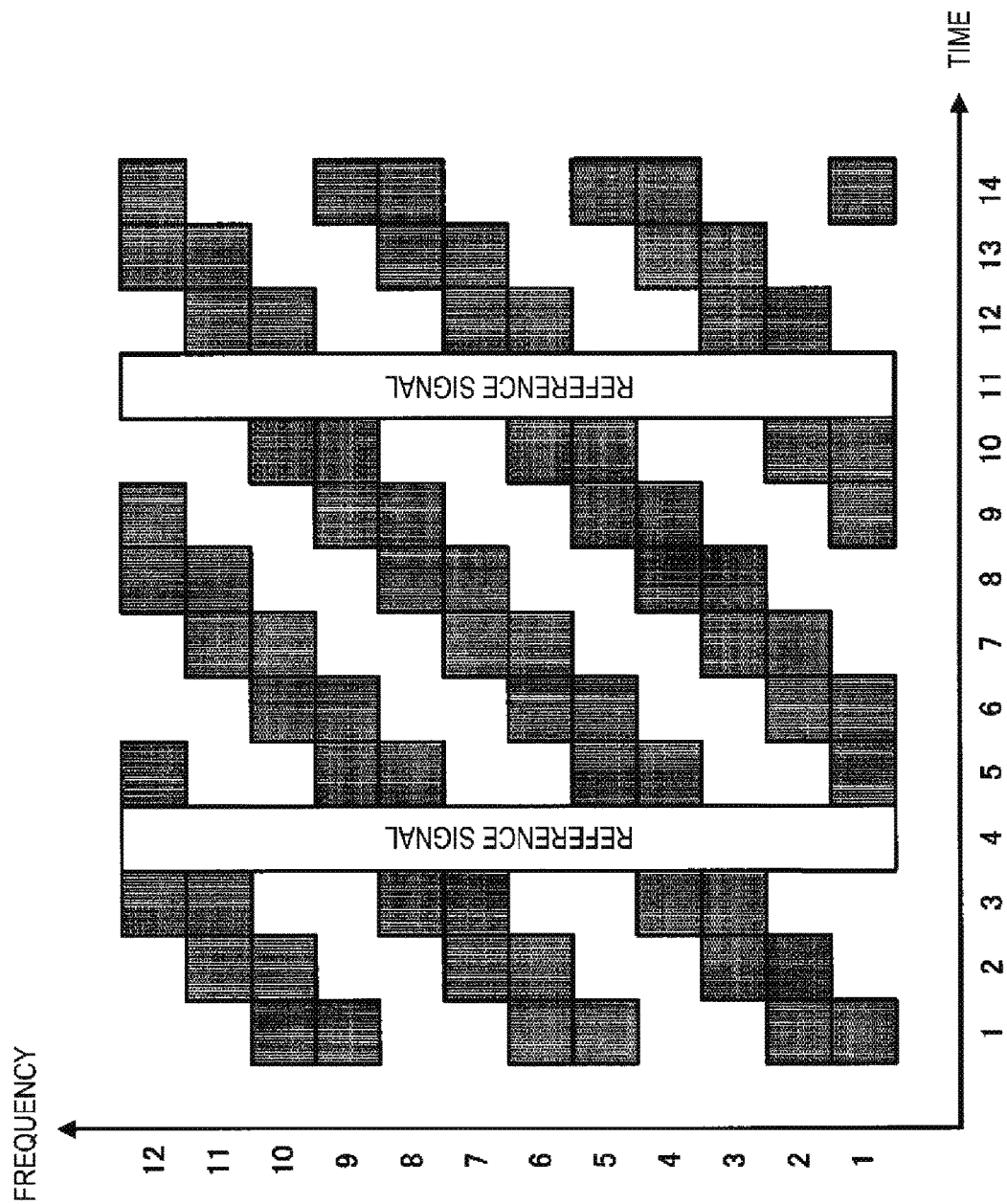
FIG. 10 is a diagram illustrating a resource allocation in a case that a different sparse code for each subcarrier is applied to the time domain according to the present embodiment.

FIG. 10 is another example of a method for causing the numbers of subcarriers in the respective OFDM symbols to be constant. As illustrated in FIG. 10, also in a case that the same sparse codes are applied in the time direction, using the sparse codes in a temporally cyclic manner allows the numbers of subcarriers in the respective OFDM symbols to be constant.

The output from the spread unit 203 is input to a mapping unit 204. The mapping unit 204 uses the input from the spread unit 203 and the reference signal input from the reference signal generation unit to generate a frame (subframe, slot, or mini-slot). The output from the mapping unit 204 is input to the IFFT unit 205, and IFFT processing is applied. A signal after the IFFT is applied is input to a CP addition unit 206. The CP addition unit 206 adds a Cyclic Prefix (CP). A signal to which the CP is added is input to a radio transmitting unit 207. In the radio transmitting unit 207, filtering processing and up-conversion are applied. A signal output from the radio transmitting unit 207 is transmitted to the base station apparatus via a transmit antenna 208.

Figure 8:
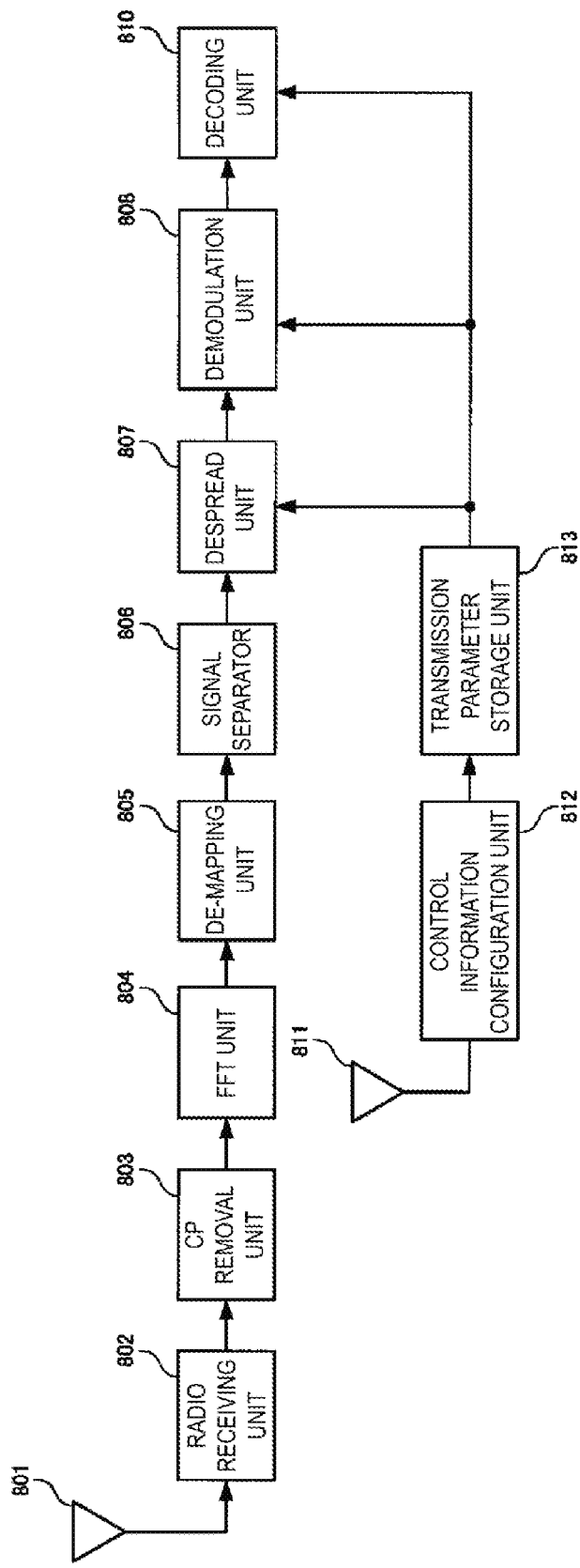
FIG. 8 is a diagram illustrating a configuration example of a receiver in a base station apparatus according to the present embodiment.

FIG. 8 illustrates a configuration example of the base station apparatus. A signal transmitted by the terminal apparatus is received by a radio receiving unit 802 via a receive antenna 801. The radio receiving unit 802 applies the filtering processing and the up-conversion processing. The output from the radio receiving unit 802 is input to a CP removal unit 803. The CP removal unit 803 removes the CP added by the terminal apparatus. The output from the CP removal unit is input to an FFT unit 804. The FFT unit 804 converts a time domain signal into a frequency domain signal. The output from the FFT unit 804 is input to a de-mapping unit 805. The de-mapping unit 805 demultiplexes the reference signal multiplexed by the terminal apparatus and extracts resources used for the communications. The output from the de-mapping unit 805 is input to a signal separator 806. The signal separator 806 applies the filtering processing, cancelling processing, Belief Propagation (BP), MPA, maximum likelihood estimation, and the like to demultiplex the signals transmitted by the respective transmission apparatuses. The signal output from the signal separator 806 is input to a despread unit 807. The despread unit 807 performs despread processing with a spreading code sequence input from a transmission parameter storage unit 813. The sparse code sequence is determined from information included in the control information input from a control information configuration unit 812, a subcarrier index, a subframe index, an OFDM symbol index, or the like. Note that while the signal separator 806 and the despread unit 807 are configured as separate blocks in the present embodiment, the signal separation and the despread may be performed in the same block. The output from the despread unit 807 is input to a demodulation unit 808. The demodulation unit 808 is notified of a modulation scheme applied in the transmission apparatus from the transmission parameter storage unit 813, demodulation processing is applied based on the modulation scheme, and a bit Log Likelihood Ratio (LLR) sequence is output. The output from the demodulation unit 808 is input to a decoding unit 808. Information on error correcting coding, such as a coding rate, input from the transmission parameter storage unit 813 is input to a decoding unit 810, and information bits after the error correction are obtained from the information and the bit LLR sequence input from the demodulation unit 808. Note that at least a part of the information input to the transmission parameter storage unit 813 by the control information configuration unit 812 is input to the terminal apparatus via a transmit antenna 811.

As described above, in a case that the SCMA is applied, the SCMA spreading code is changed for each OFDM symbol and/or for each subcarrier, thus allowing a tolerance to a channel variation to be improved and allowing the PAPR to be improved.

Second Embodiment

While the example where the sparse codes are applied to the multiple OFDM symbols in one subframe has been described in the first embodiment, an example where different sparse codes are used in different subframes (slots, mini-slots) will be described in the present embodiment.

Figure 9:
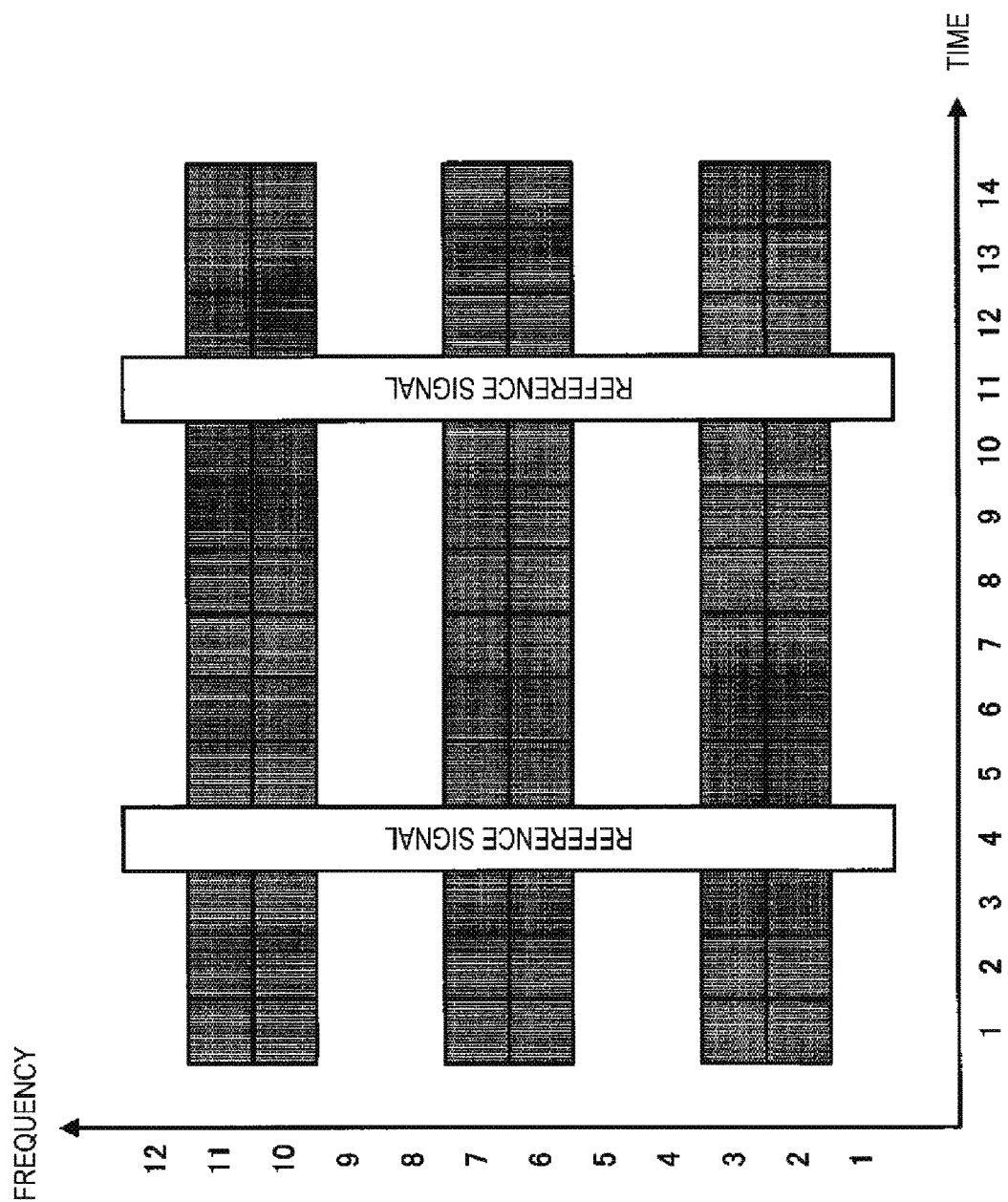
FIG. 9 is a diagram illustrating a resource allocation during retransmission according to the present embodiment.

For example, in FIG. 3, in a case that degradation due to frequency selective fading occurs in the frequency indexes 8 and 9, an error occurs. Accordingly, the base station apparatus transmits the control information to the terminal apparatus such that the different sparse codes are used during retransmission. For example, FIG. 9 illustrates an example of selecting the sparse codes for using the subcarriers not used with the sparse codes used in FIG. 3. In the example, since the frequency indexes 8 and 9 are not used, in a case that a channel (channel) has a gradual time variation, the control information reception unit 211 in the terminal apparatus receives the information on the sparse code for retransmission and inputs the information to the transmission parameter configuration unit 212. Note that FIG. 9 is one example, and the same subcarrier as the subcarrier used in the initial transmission or the previous transmission may be used. Based on the information on the sparse code for retransmission, the parameter configuration unit 212 inputs a sequence of the sparse code different from that of the initial transmission to the spread unit 203. Note that it is not always necessary to notify the information on the sparse code from the base station apparatus at the time of a retransmission request, and a sparse code may be determined by the information on the sequence of the sparse code notified at the time of the initial transmission and the number of retransmissions (redundancy version). Furthermore, the terminal apparatus may autonomously select a sparse code from multiple sparse codes.

During retransmission, a sequence length of the sparse code, namely, a spreading rate, may be changed for transmission. Information on the spreading rate may be included in the DCI notified from the base station, or may be defined by the RRC.

In this manner, the use of the sparse code different from that of the initial transmission at the time of the retransmission allows the transmission to be performed using at least partially different subcarriers and/or OFDM symbols, making it possible to obtain satisfactory transmission performance due to frequency and/or time diversity.

A program running on an apparatus according to one aspect of the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In that case, a program for realizing the functions of the embodiments may be recorded on a computer readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which components, described in the respective embodiments and having mutually the same effects, are substituted for one another is also included in the technical scope of the present invention.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which components, described in the respective embodiments and having mutually the same effects, are substituted for one another is also included in the technical scope of the present invention.

INDUSTRIAL APPLICABILITY

One aspect of the present invention can be used, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

101 Base station apparatus
102, 103 Terminal apparatus
201 Coding unit
202 Modulating unit
203 Spread unit
204 Mapping unit
205 IFFT unit
206 CP addition unit
207 Radio transmitting unit
208 Transmit antenna
210 Receive antenna
211 Control information reception unit
212 Transmission parameter configuration unit
801 Receive antenna
802 Radio receiving unit
803 CP removal unit
804 FFT Unit
805 De-mapping unit
806 Signal separator
807 Despread unit
808 Demodulation unit
810 Decoding unit
811 Transmit antenna
812 Control information configuration unit
813 Transmission parameter storage unit

The invention claimed is:

1. A terminal apparatus that transmits a data signal to a base station apparatus, the terminal apparatus comprising:
a transmission parameter configuration unit configured to generate a sequence including a zero and to transmit the data signal;
a spread unit configured to multiply a modulation symbol of the data signal by the sequence; and
a mapping unit configured to map the data signal multiplied by the sequence to a first radio resource area or a second radio resource area each including multiple resource elements, wherein
the transmission parameter configuration unit causes the sequence by which the modulation symbol mapped to the first radio resource area is multiplied and the sequence by which the modulation symbol mapped to the second radio resource area is multiplied to be differently configured depending on whether the transmission of the data signal is an initial transmission or a retransmission.

2. The terminal apparatus according to claim 1, wherein the first radio resource area is included in a first orthogonal frequency division multiplexing (OFDM) symbol, the second radio resource area is included in a second OFDM symbol, and a subcarrier for a resource element of the multiple resource elements in the first radio resource area overlaps with a subcarrier for a resource element of the multiple resource elements in the second radio resource area.

3. The terminal apparatus according to claim 2, wherein the transmission parameter configuration unit generates the sequence such that a number of the multiple resource elements included in the first OFDM symbol is identical to a number of the multiple resource elements included in the second OFDM symbol.

4. The terminal apparatus according to claim 1, wherein the first radio resource area is included in a first subcarrier, the second radio resource area is included in a second subcarrier, and an OFDM symbol for a resource element of the multiple resource elements in the first radio resource area overlaps with an OFDM symbol for a resource element of the multiple resource elements in the second radio resource area.

5. The terminal apparatus according to claim 4, wherein the multiple resource elements in the first radio resource area and the multiple resource elements in the second radio resource area each includes a first OFDM symbol and a second OFDM symbol, and the transmission parameter configuration unit generates the sequence such that a number of the multiple resource elements included in the first OFDM symbol is identical to a number of the multiple resource elements included in the second OFDM symbol.

* * * * *